US007165227B2

(12) United States Patent
Ubillos

(10) Patent No.: US 7,165,227 B2
(45) Date of Patent: *Jan. 16, 2007

(54) SCALABLE SCROLL CONTROLLER

(75) Inventor: Randall Hayes Ubillos, Los Altos, CA (US)

(73) Assignee: Apple Computer, Inc., Cupertino, CA (US)

( * ) Notice: Subject to any disclaimer, the term of this patent is extended or adjusted under 35 U.S.C. 154(b) by 355 days.

This patent is subject to a terminal disclaimer.

(21) Appl. No.: 10/253,182

(22) Filed: Sep. 23, 2002

(65) Prior Publication Data

US 2003/0016248 A1    Jan. 23, 2003

Related U.S. Application Data

(63) Continuation of application No. 09/287,720, filed on Apr. 7, 1999, now Pat. No. 6,486,896.

(51) Int. Cl.
*G06F 3/033* (2006.01)
*G06F 3/048* (2006.01)
*G06F 3/18* (2006.01)
*G09G 5/30* (2006.01)
*G09G 5/32* (2006.01)
*G09G 5/34* (2006.01)
*G09G 5/373* (2006.01)
*G06F 17/30* (2006.01)
*G09G 5/38* (2006.01)

(52) U.S. Cl. .................... 715/784; 345/665; 345/661; 345/663; 715/786

(58) Field of Classification Search ............. 345/400.1, 345/660–661, 663, 667, 665; 715/781, 784, 715/786–787, 815, 830
See application file for complete search history.

(56) References Cited

U.S. PATENT DOCUMENTS

| 4,755,811 | A |   | 7/1988  | Slavin et al. |
|-----------|---|---|---------|---------------|
| 4,790,028 | A |   | 12/1988 | Ramage |
| 4,794,388 | A |   | 12/1988 | Matthews |
| 5,032,989 | A |   | 7/1991  | Tornetta |
| 5,075,673 | A |   | 12/1991 | Yanker |
| 5,129,057 | A |   | 7/1992  | Strope et al. |
| 5,136,690 | A |   | 8/1992  | Becker et al. |
| 5,418,549 | A |   | 5/1995  | Anderson et al. |
| 5,479,600 | A |   | 12/1995 | Wroblewski et al. |
| 5,491,781 | A | * | 2/1996  | Gasperina ................... 715/786 |
| 5,533,182 | A | * | 7/1996  | Bates et al. ................. 715/727 |
| 5,553,225 | A |   | 9/1996  | Perry |

(Continued)

*Primary Examiner*—Raymond J. Bayerl
*Assistant Examiner*—Namitha Pillai
(74) *Attorney, Agent, or Firm*—Blakely, Sokoloff, Taylor & Zafman LLP

(57) ABSTRACT

A method for accessing a data field having fine resolution is disclosed. The method includes providing a scalable scroll controller with a scale controller to modify a scale for controlling a magnification for accessing data within the data field. The method also includes receiving a first user event to select the scale controller and receiving a second user event to modify a position of the scale controller. The scale is adjusted based on the position of the scale controller. An apparatus for performing the method is also disclosed.

24 Claims, 12 Drawing Sheets

U.S. PATENT DOCUMENTS

| | | | |
|---|---|---|---|
| 5,854,629 A * | 12/1998 | Redpath | 715/830 |
| 5,872,566 A * | 2/1999 | Bates et al. | 715/786 |
| 5,977,972 A * | 11/1999 | Bates et al. | 715/786 |
| 6,061,062 A * | 5/2000 | Venolia | 715/856 |
| 6,075,467 A * | 6/2000 | Ninagawa | 340/995.14 |
| 6,208,343 B1 * | 3/2001 | Roth | 715/786 |
| 6,320,577 B1 * | 11/2001 | Alexander | 345/440.1 |
| 6,330,009 B1 * | 12/2001 | Murasaki et al. | 715/784 |
| 2003/0197718 A1 | 10/2003 | Venolia | |
| 2004/0160416 A1 | 8/2004 | Venolia | |

* cited by examiner

SCALABLE SCROLL CONTROLLER

This application is a continuation application of U.S. patent application Ser. No. 09/287,720, filed Apr. 7, 1999, issued as U.S. Pat. No. 6,486,896 B1.

BACKGROUND OF THE INVENTION

1. Field of the Invention

This invention is related to the field of user interfaces and program controls. More particularly, this invention is directed to a method and apparatus For allowing simultaneous zooming and panning of content in a graphical user interface display.

2. Description of Background

A portion of the disclosure of this patent document contains material which is subject to copyright protect on. The copyright owner has no objection to the facsimile reproduction by any one of the patent disclosure, as it appears in the Patent and Trademark Office patent files or records, but otherwise reserves all copyright rights whatsoever.

Many types of data have a broad range and a fine resolution. For example, a video clip is composed of a continuum of frames. The video clip can store up to a series of tens of thousands of frames. Thus, it has approximately five orders of magnitude. Similarly, a five second digital audio chip may require five orders of magnitude to access each bit sample. These types of data are often linear in the sense that there are starting and ending points and many Linked "frames" or points of data between the starting and ending points.

In order to edit a video clip, one needs frame accurate control over the entire medium. In other words, a user must be able to readily pick out one particular desired frame nestled among tens of thousands of frames. It becomes readily apparent that tasks such as adjusting key frames in an video film or manipulating audio samples, can quite time consuming and frustrating. What is needed is a method or apparatus which lets the user find and access one particular desired piece of data which is located among a broad range of data.

In the past, access to a particular point or frame of data was accomplished by using scroll bars. However, scroll bars typically can handle only two orders of magnitude. Consequently, a scroll bar would either need to be approximately twenty yards long in order to grant access to each frame of a video disk or provide a very compressed view of the frames in the video clip. The former user interface is impracticable, the latter would not be useful.

Another method used in the prior art was to implement VCR-type controls. This allows the user control over the entire range of data. However, these types of controls lack selectivity. For example, it would be difficult for a user to stop precisely on one particular desired frame or data point. The user would probably either overshoot or undershoot the desired frame or data point and would need to go back and forth searching for that particular frame or data point. What is needed is a method that gives the user control over a broad range, while giving the user random access to any particular piece of data within that range, especially at fine resolutions.

Yet another method used in the prior art to solve this problem is to provide one control for magnification of the data and another control for scanning at the selected magnification. One product utilizing has technique Is SoundEdit™ by Farallon Computing, Inc. However, this implementation has a drawback in that it requires two separate controls. A further disadvantage is that these two controls cannot be operated simultaneously. A user has to change the magnification control independently from the navigation control. Such a system results in wasted time and effort. Thus, what is needed is a method and apparatus for providing the user with easy and fluid interaction over varying magnification scales while simultaneously providing the user with the capability of scanning at that magnification scale.

SUMMARY

In view of the problems associated with providing a user with control over a broad range of data, particularly linear data, one objective of the present invention is to provide the user with access or data down to very fine resolutions in a simple, natural, and effective method by utilizing a cursor positioning device such as a mouse, a paddle, a trackball, touch tablet, joystick or other input device having the capability of providing control for cursor movement in at least a single dimension.

Another objective is to increase the speed, accuracy, and selectivity of accessing data over a broad range by providing the user with easy and fluid interaction over varying magnification scales, while simultaneously providing the user with the capability of scanning the data at that magnification scale.

A method and device for accessing a broad data field having a fine resolution is described. A default scale is provided and is represented and controlled by a scalable scroll bar with a width that is proportional to the scale that is being represented. The scale controls the magnification at which the user accesses and/or examines the data. At a selected magnification, there is a particular range of the data (from one point in the data to another point in the data) that is provided. The present invention allows the user to modify the scale, which also changes the displayed range to be over different portions of the data field. The scale is varied by the user by manipulating the scalable scroll bar. Thus, the user may "zoom in" and "zoom out" to different portions of the data field. In addition, by moving the range to encompass different portions of the data field, the user can scan that portion of the data field.

In one embodiment of the present invention, a particular piece of data within the broad data field can be accessed. First, the scale is selectively varied, thereby controlling a range within the data field. Then, the range is moved to encompass a portion of the data field in which the piece of data resides. Next, the scale is successively decreased while, simultaneously, points successively closer to the location are kept within the range. The scale is decreased, which increased the magnification (i.e., increasing the range's resolution). The range is moved in this manner until the piece of data is actually accessed.

This is accomplished by using an input device having at least one degree of freedom (e.g., a mouse, a paddle, trackball, touch tablet, joystick, etc.). For example, movement can be along an x or an y-axis in a Cartesian coordinate system. Combined with the closing of a switch, movement along the axis may control the selection of the scale and the range at that scale. In preferred embodiment, the data from the input device can be remapped to control the position of a cursor on a display screen in one axis of movement, instead of the scale and range. In other words, the same input device can control either the position of a cursor or control the scale and range, simply by remapping the axes of the input device.

Other objects, features, and advantages of the present invention will be apparent from the accompanying drawings and from the detailed description that follows below.

BRIEF DESCRIPTION OF THE DRAWINGS

The present invention is illustrated by way of example, and not by way of limitation, in the figures of the accompanying drawings and in which Like reference numerals refer to similar elements and in which.

DETAILED DESCRIPTION

A method and apparatus for providing the user with easy and fluid interaction over varying magnification scales, while simultaneously providing the user with the capability of scanning at that scale is described. In the following description, the present invention is implemented in reference to a zooming timeline controller and a zooming multimedia editor/viewer.

Figure 1:
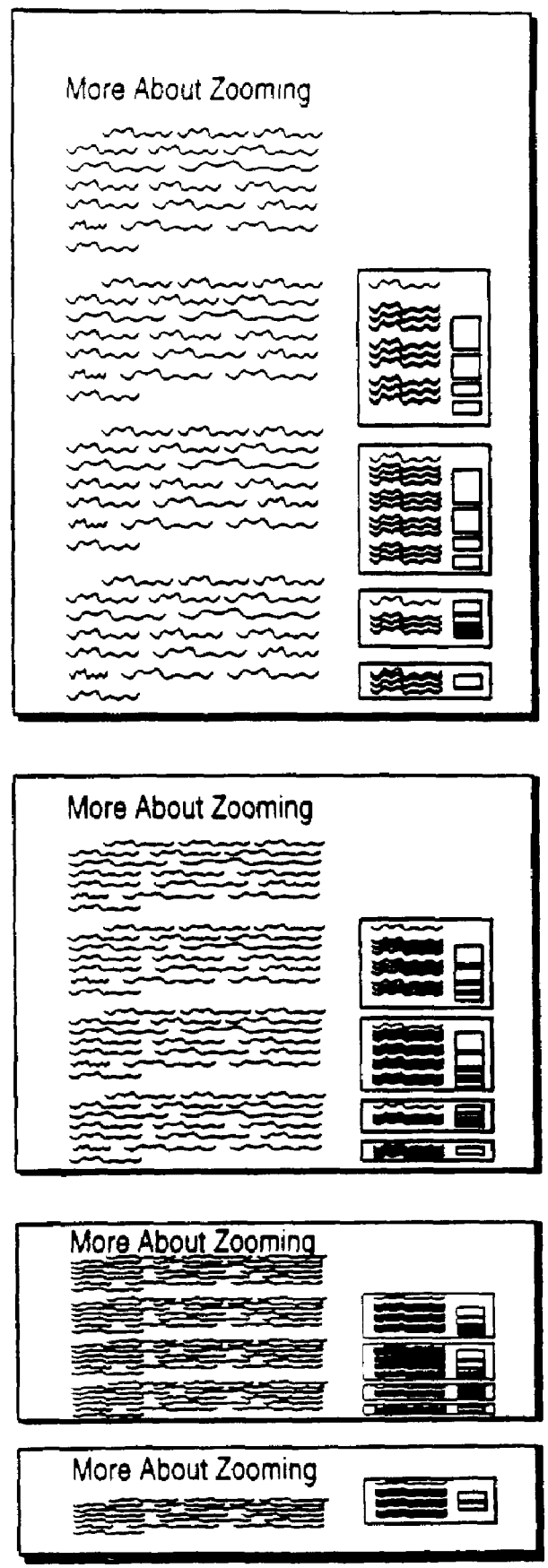
FIG. 1 shows an example of the reduction of a full sized textual document as implemented by one embodiment of the present invention.

It will be obvious, however, to one skilled in the art that the present invention can equally be applied to other implementations, as well. For example, the present invention can be used in conjunction with editing textual documents. This invention enhances the user's ability to view a textual document at any point in its creation history by enabling the user to control the historical view of a document that may have been around for years and modified on a time scale of seconds. Thus, the present invention enhances the control of a document by showing the state of the document as it appeared at a selected time. On the other hand, the present invention can be used to graphically reduce a document. By using the structure implicit in the document, a more semantically valid zoom can be achieved. Outlines can progressively collapse the most-indented items, showing just structure and spacing. FIG. 1 shows the reduction of a full sized textual document. The sequence of steps for a textual document as it is zoomed out are: squeezing out white space, squashing all but the first lines of each paragraph, eliminating all but the first lines, eliminating all body text while leaving headings and sub-headings, then eliminating sub-heads, leaving headings only. Similarly, computer programs may also be edited in this manner.

Figure 2:
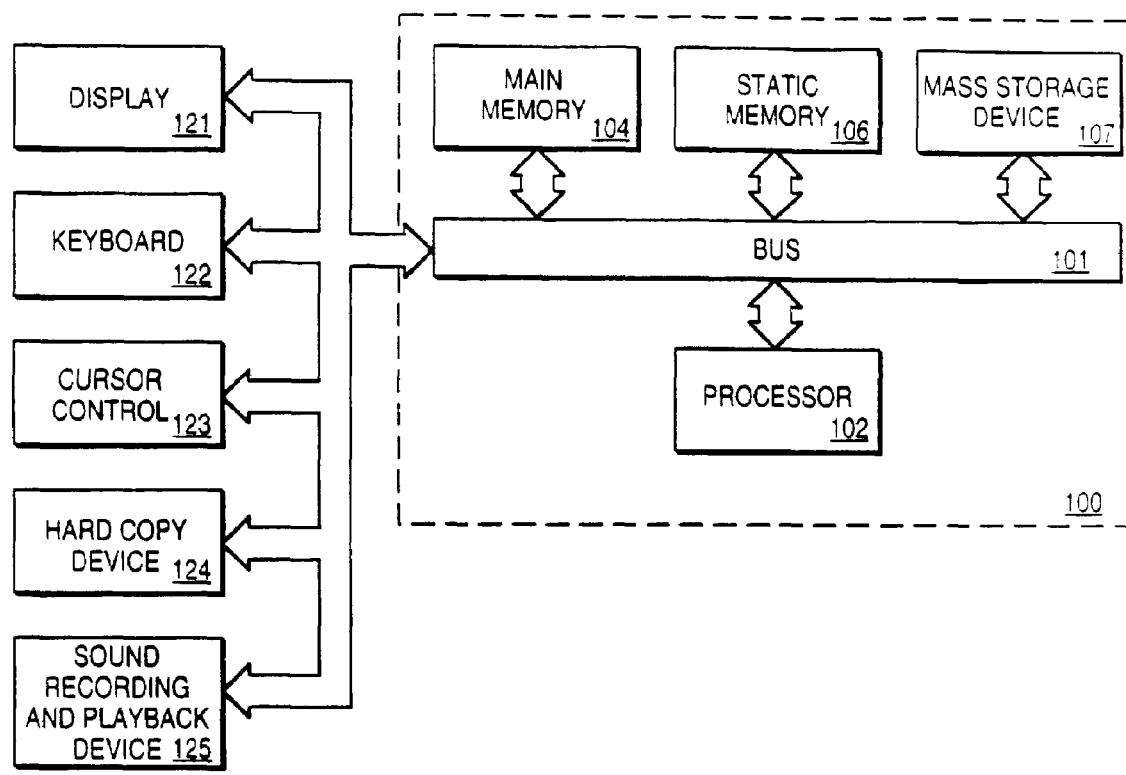
FIG. 2 is a block diagram of the computer system upon which the present invention may be implemented.

Referring to FIG. 2, the computer system, upon which the preferred embodiment of the present invention my be implemented is shown as computer system 100. Computer system 100 comprises a bus or other communication means 101 for communicating information, and a processing means 102 coupled with bus 101 for processing information.

Computer system 100 further comprises a random access memory (RAM) or other dynamic storage device 104 (referred to as main memory), coupled to bus 101 for storing information and instructions to be executed by processor 102. For example, code or computer readable instructions is contained in main memory 104. Main memory 104 also may be used for storing temporary variables or other intermediate information during execution of instructions by processor 102.

Computer system 100 also comprises a read only memory (ROM) and/or other static storage device 106 coupled to bus 101 for storing static information and instructions for processor 102, and a data storage device 107 such as a magnetic disk or optical disk and its corresponding desk drive. Data storage device 107 is coupled to bus 101 for storing information and instructions.

Computer system 100 may further be coupled to a display device 121, such as a cathode ray tube (CRT) coupled to bus 101 for displaying information to a computer user. An alphanumeric input device 122, including alphanumeric and other keys, may also be coupled to bus 101 or communicating information and command selections to processor 102. An additional user input device is cursor control 123, such as a mouse, a trackball, or cursor direction keys, coupled to bus 101 for communicating direction information and command selections to processor 102, and for controlling cursor movement on display 121. This input device typically has two degrees of freedom in two axes, a first axis (e.g. x) and a second axis (e.g. y), which allows the device to specify any position in a plane. Another device which may be coupled to bus 101 is hard copy device 124 which may be used for printing instructions, data, or ether information on a medium such as paper, film, or similar types of media. Lastly, computer system 100 may be coupled to a device for sound recording and/or playback 125 such an audio digitizer means coupled to a microphone for recording information. Further, the device may include a speaker which is coupled to a digital to analog (D/A) converter for playing back the digitized seconds.

Figure 3:
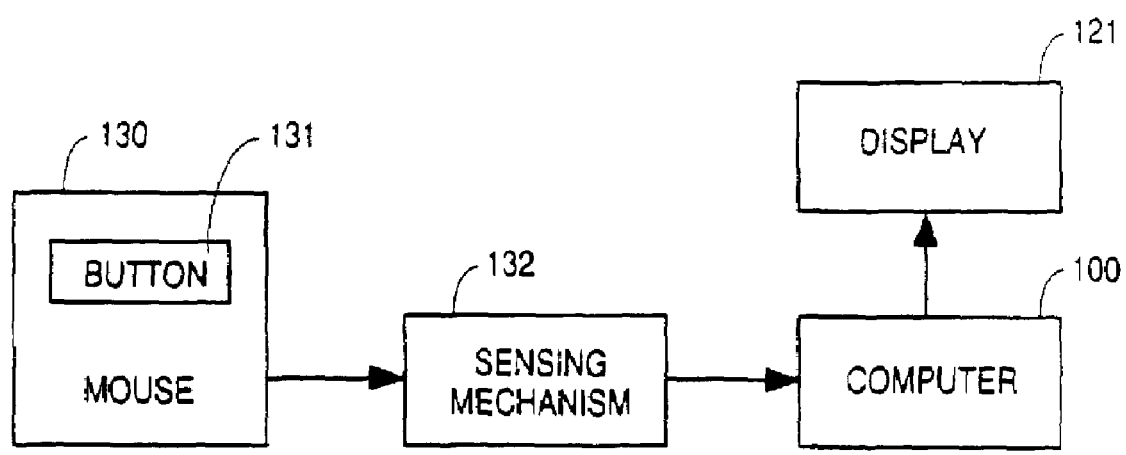
FIG. 3 is a block diagram of one embodiment of the present invention wherein a mouse is utilized.

In one embodiment of the present invention, a mouse is used. FIG. 3 is a block diagram shorting this embodiment. A mouse 130 is a small hand-held box-like device which is coupled to the computer system 100 by a cable. A sensing mechanism 132 monitors the magnitude and direction of movement of mouse 130 and generates an output signal based thereon. This signal is sent to computer 100 for processing. After processing, computer 100 sends a signal to display device 121, directing the movement of a cursor on the display device screen. One or more push-down button(s) 131 are provide on the mouse 130. By depressing button(s) 131, a signal is sent to computer 100 that a desired location of the cursor on display device 121 has been selected. The combination of moving mouse 130 to point the cursor to an object on the display screen and pressing the button(s) 131, while the cursor is pointing to the object to select the object, is called "point and click."

If mouse 130 is moved while there is a depression on button(s) 131 when the cursor is on a graphical user interface device or widget, then the graphical user interface device will be moved. For example, the placement of the cursor on a graphical user interface control such as a scroll bar and the depression of button(s) 131 will allow the movement of the scroll bar to track the movement of the cursor by mouse 130.

Some parameters need an approximate setting. Others demand a more precise value. When controlling a remapped approximate parameter, each unit of motion of the mouse can effect a change in he value of the parameter. For example, if the mouse has units of movements in one hundredth of an inch, each five unit of mouse movements can translate to a movement of one pixel of the cursor. For values that need to be controlled more precisely, one embodiment is to reduce the mouse's motion units by a certain factor. Otherwise, the mouse's movements become too sensitive. For example, the number of units of mouse movements that will cause the cursor to move one pixel can be increased to ten.

When values are assigned to parameters, one embodiment is to make the mouse axes consistent with a positive or a negative change in that parameter's value. In other words, if a slider, scroll bar, or other graphic widget is used to represent the value that the mouse is controlling, the mouse axes are remapped to the dominant graphic axes. For example, if the slider is graphically oriented vertically, upward motion of the mouse roves the slider knob up. Even if a parameter value has no graphic representation in the system, a standard is applied consistently. One embodiment of this concept is to define rightward and downward movement to be "more" or increase in value, and leftward and upward movement to be "less" or decrease in value.

In one embodiment of the present invention, the mouse is used to allow a user to simultaneously adjust both the control of the time scale and the control for scanning at the selected time scale. This is accomplished by allowing "click and drag" of the mouse to controlling the time scale and the selected value at that time scale. In other words, by depressing the mouse button while the cursor is positioned over certain interface elements, the movement of the mouse adjusts the time scale and selected value at that time scale. These parameters and their control will be explained in greater detail below.

In another embodiment, cursor control may be performed through the use of a voice command recognition system, interfaced through use of sound recording and playback device 125. Thus, the user provides controls by voice to move and provide selection commands for the cursor. For example, the user may provide commands to zoom-in on the range by saying "zoom-in 10%" to sound recording and playback device 125. The user may also control the movement of the range that is displayed by saying "shift right, 5 seconds", which shifts the range that is displayed by 5 seconds (alternatively, the user may shift the displayed range by any other time factor). The control provided by cursor control device 123 may therefore be replicated by voice commands.

The present invention as applied to a timeline controller enables the user to browse the time domain for a range of time at any time scale (magnification) or choose an incremental time value by successive refinement. The timeline controller zooms on a time continuum for picking a date/time. This is accomplished by utilizing a mouse with a modified scroll bar in the manner described below.

Figure 4:
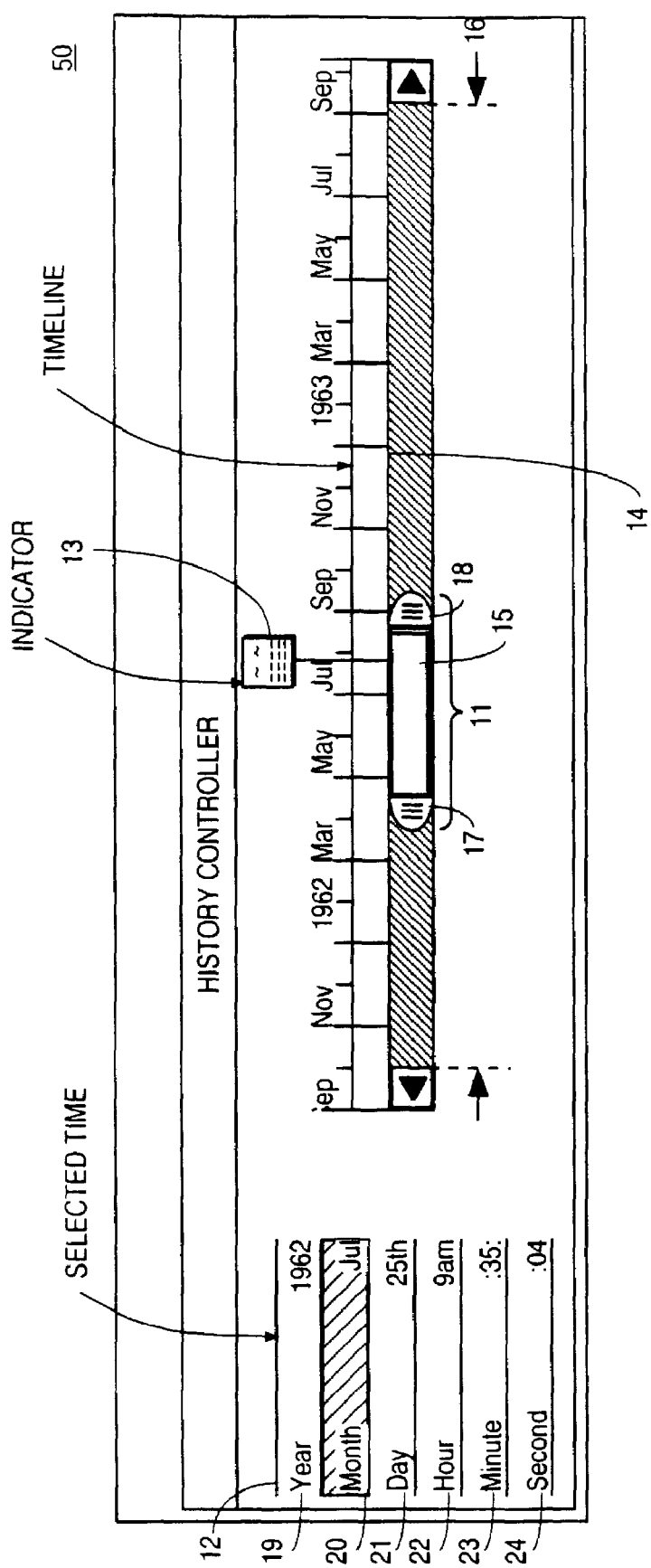
FIG. 4 is a screen shot of a timeline controller integrating a scalable scroll controller in accordance with one embodiment of the present invention.

FIG. 4 shows a timeline controller 50. Basically, the user controls the time scale and :he range of time that is visible. The time scale is controlled and shown by scalable scroll controller 11. Scalable scroll controller 11 also gives the current scale of timeline 14. The selected time is shown both in the column of fields 12 and by the indicator 13 on timeline 14.

Scalable scroll controller 11 is comprised of a horizontal bar 15 and scale controllers 17 and 18. Scalable scroll controller 11 is located in a scroll area 15. By using the mouse or offer cursor positioning means to position the cursor on horizontal bar 15 and clicking and holding down the mouse button, scalable scroll controller 11 will track the movement of the mouse by sliding left and right as the mouse is dragged left and right, respectively. Scalable scroll controller 11 will continue to track the horizontal mouse movements until the mouse button is released. All the while that scalable scroll controller 11 is being moved, the range of the history being displayed in timeline 14 is also correspondingly shifted according to the horizontal movements of scalable scroll controller 11.

Scalable scroll controller 11 can also be controlled by disassociating the mouse control from the cursor and moving the mouse in a horizontal motion. For example, the disassociation may be done with a modified mouse click and drag, the modification signal being supplied in one embodiment by a switch (e.g., a key) on a keyboard. Scalable scroll controller 11 moves correspondingly to the horizontal movement of the mouse. As scalable scroll controller 11 slides left or right, the range of history that is displayed is shifted left or right, respectively.

Scalable scroll controller 11 also includes scale controllers 17 and 18. By placing the cursor on and click-dragging either one of scale controllers 17 and 18, the scale of timeline 14 may be change. For example, by placing a cursor on scale controller 17 and click-dragging to the left, the scale of timeline 14 increases (i.e., the amount of time covered by the timeline increases), thereby decreasing the resolution of timeline 14. In other words, the magnification at which one observes the data (timeline) decreases. Conversely, as scale controller 17 is moved to the right, the scale of timeline decreases (i.e., the amount of time covered by the timeline decreases), thereby increasing the resolution of timeline 14. Click-dragging scale controller 18 to the right or left has the same effect of increasing or decreasing, respectively, the scale of timeline 14.

As the scale of timeline 14 changes, so too is the appearance of the timeline altered to reflect the new scale. In addition, the appearance of scalable scroll controller 11 also changes with the change of scale of timeline 14. For example, if the time scale is compressed such that the portion of the total history that is shown in timeline 14 is increased, then the width of horizontal bar 15 is increased proportionally. If time scale is compressed to the point where the total history is shown in timeline 14, then the width of horizontal bar 15, including scale controllers 17 and 18, expands to fill scroll area 16.

Figure 5A:
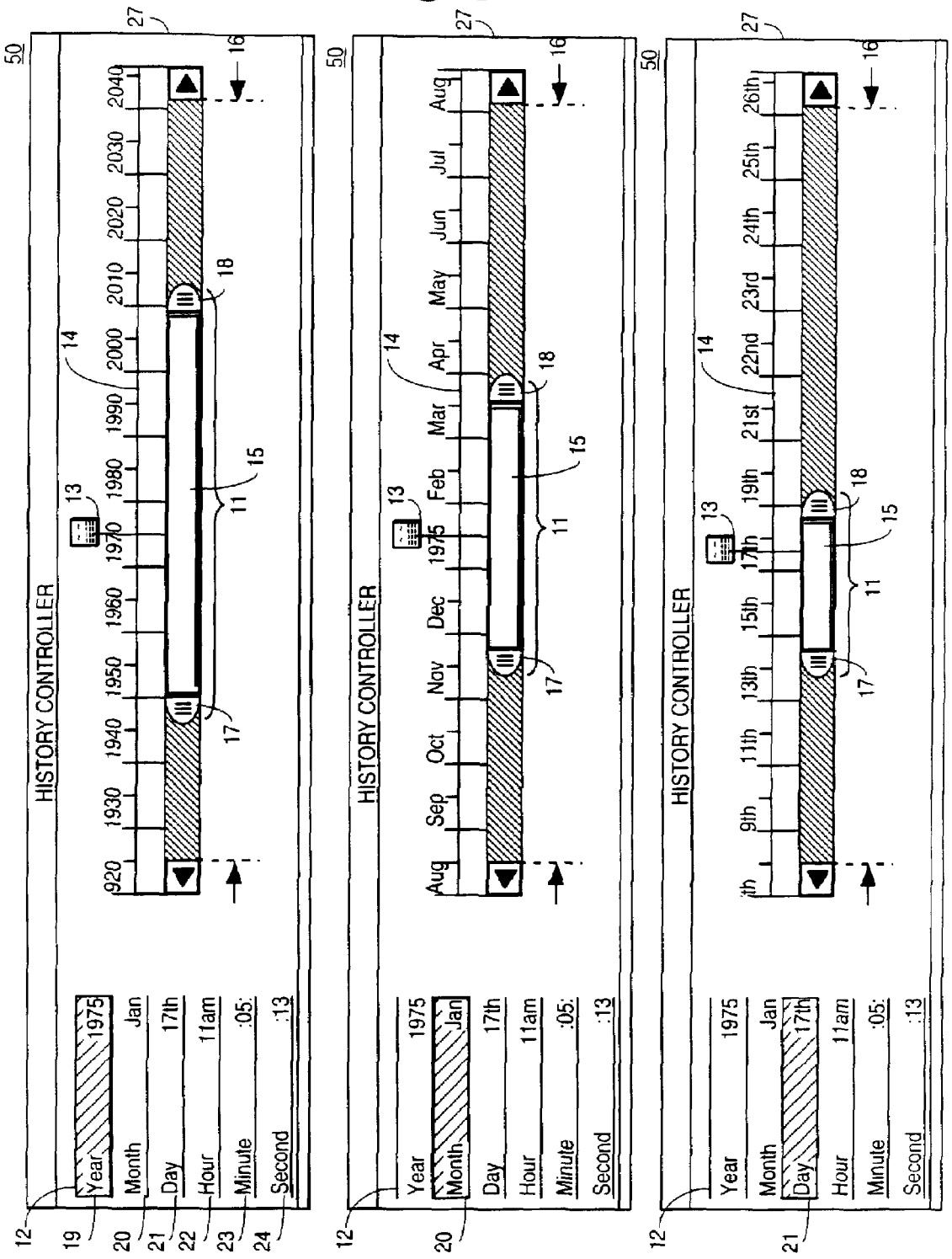
FIG. 5 are a series of screen shots of the timeline controller at various time scales ranging from decades to seconds.
Figure 5B:
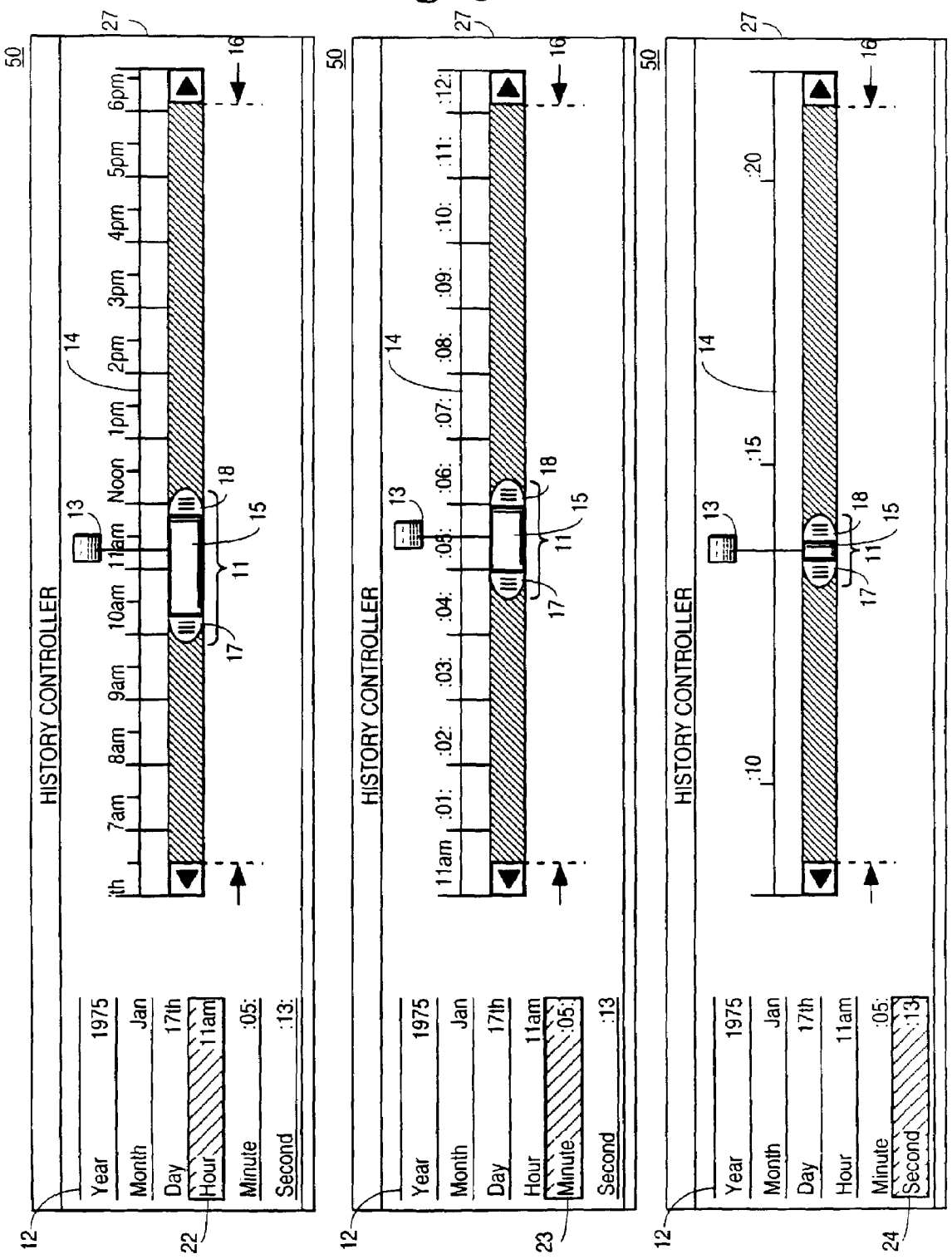

FIG. 5 shows screen shots 25–30 of timeline 14 at various scales ranging from decades to seconds. The selected time is shown by the column of fields 12. The column of fields 12 is divided into rows 19–24, corresponding to convenient time fields, shown on the left-hard side, and the selected time units, shown on the right-hand side. Row 19 gives the year field (Year) and the selected year unit (1975). Row 20 gives the month field (Month) and the selected month unit (January). Row 21 gives the day field (Day) and the selected day unit (17th). Row 22 gives the hour field (Hour) and the selected hour unit (11 am). Row 23 gives the minute field (Minute) and the selected minute unit (:05). Row 24 gives the seconds field (Second) and the selected second unit (:13). Thus, the selected time in screen shot 25 in FIG. 5A is 13 seconds past 11:05 am of Jan. 17, 1975.

It can be seen from screen shots 25–30 that timeline 14 looks different for different time scales, even though they represent the same selected time (i.e., 11:05:03 am Jan. 17, 1975). Screen shot 25 depicts timeline 14 wherein the scale is in years. The selected field is depicted by shading the correct row 19–24 which corresponds to that particular scale. In screen shot 25, since the year field was selected, row 19 which corresponds to the year field, is shaded. The selected year, "1975", is shown on the right-hand side of roof 19. Similarly, screen shot 26 depicts timeline 14 wherein the scale is in months. Accordingly, row 20 which corresponds to the month field, is shaded. Likewise, screen shots 27–30 depict timeline 14 wherein the scale is in days, hours, minutes, and seconds, respectively.

It can be seen from screen shots 25–30 of FIG. 5 that as the scale is decreased, the resolution of timeline 14 is increased. Screen shot 25 shows the scale in years. Timeline 14 gives a range or approximately a decade. This allows the user to select a time to a resolution of years. Screen shot 26 shows the scale in months. Its timeline gives a range of approximately two years. This allows the user to select a time to a resolution of months instead of years. As the scale is decreased, the resolution increases. Screen shot 30 shows the scale in seconds. The range of timelife 14 for screen shot 30 covers a range of approximately 15 seconds. This allows the user to select a time to a resolution of seconds. Thus, this embodiment of the present invention allows the user to select a particular time, within seconds, from a range of a century.

The fields and the selected times are highlighted up to the current finest-resolved selected time. Finer scales and units are dim, in comparison. This is illustrated in FIG. 5. In screen shot 25, the selected scale is in years and the corresponding selected time unit is 1975. Thus, for that resolution, the "Year" field and the "1975" time unit are highlighted. As the resolution increases, as in screen shot 28, it can be seen that the prior selected fields (i.e., "Year", "month", and "Day") and selected time units ("1975", "Jan", and "17th") remain highlighted. The current selected field ("Hour") and the current selected time unit ("11 am") are also highlighted. Yet the finer fields ("Minute" and "Second") and time units (":05:" and ":13") which have yet to be selected by the user, remain dimmed.

As shown in FIG. 5, indicator 13 includes an icon and a vertical line segment. The icon for indicator 13 resides halfway along the top of timeline 14. The vertical line segment extends from the bottom of the indicator icon, through timeline 14, to the bottom edge of timeline 14. The line segment intersects timeline 14 which corresponds to the selected time (also displayed by the column of fields 12) As the scale is changed, the icon representing the indicator also changes to reflect the change in the scale. For example, the indicator icon representing the year scale, is in the shape of an hourglass, as shown in screen shot 25. The icon representing indicator 13 changes to the shape of a calendar for time scales of months and days, as shown in screen shots 26 and 27, respectively. The icon representing indicator 13 changes to the shape of a clock for time scales of hours, minutes and seconds, as shown in screen shots 28, 29, and 30, respectively. Part of the clock-shaped indicator 13 corresponding to the seconds scale, is shaded.

Once the desired field has been selected, the user may then select any time unit within that field. For example, in screen shot 26 of FIG. 5, since the user has selected the month scale, the user may now select time units corresponding to months of the year (e.g., January–December). Furthermore, once a desired field has been selected, the scale can, nevertheless, be changed within that field. For example, in screen shot 25 of FIG. 5, even though the selected field is "Years", the user may change the scale of timeline 14 so long as what is displayed remains in years. Thus, timeline 14 may have an enlarged scale such that a decade is shown or may have a reduced scale such that only half a dozen years are shown. Likewise, in screen shot 27, given the same field ("Day"), timeline 14 may have a scale encompassing 12 days (as shown) or may have a reduced scale encompassing only a couple of days.

It Would he apparent to those skilled in the art that the timeline controller can be linked to and access a database. Some sample databases include musical compositions, films, textual documents, etc. For example, by linking the timeline controller to a musical composition, the user may easily access one particular note among thousands within the composition. This is accomplished by assigning each note to one particular incremental time unit. The user may "zoom cut" to locate the general area wherein the desired note resides. The user then "zooms in" on the desired note by successively decreasing the scale (increasing the magnitude) while keeping the note within the range until the desired note is located. Thus, the user may select a desired note by "zooming in" on it in the same manner as one would "zoom in" on a particular date/time. In other words, pieces of data within a database may be sequentially linked to incremental time intervals of the timeline controller. As example of this concept is described further below, wherein the frames of a video (or film) may be easily accessed.

Figure 6:
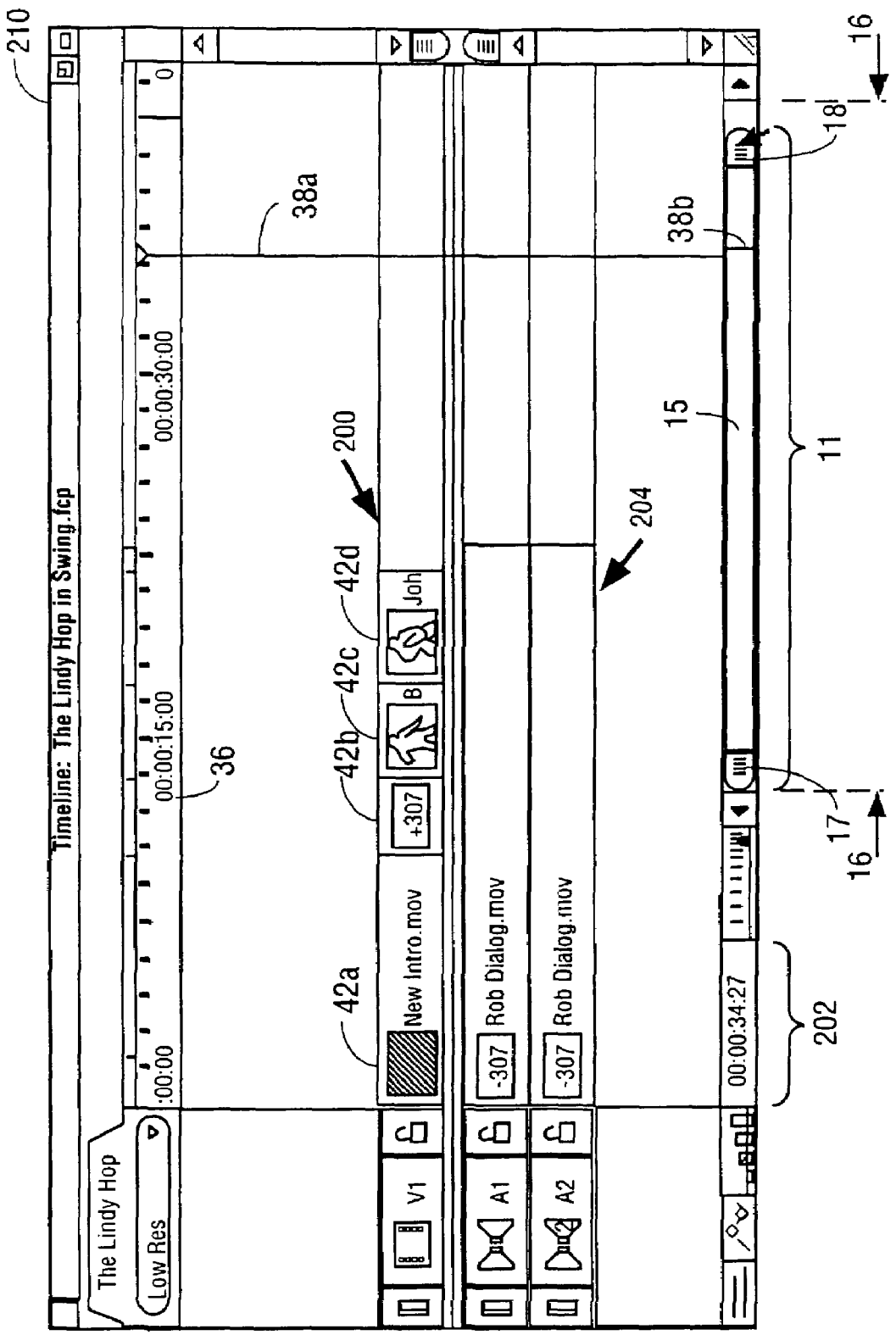
FIG. 6 is a screen shot of a multimedia controller integrating the scalable scroll controller in accordance with one embodiment of the present invention.

FIG. 6 shows an alternative embodiment of the present invention as applied to multimedia editing, the multimedia controller. Basically, the multimedia controller operates in the same manner as the timeline controller described above. Similar to the timeline controller, the user controls the time scale. However, in the multimedia controller, the user controls the selection of a video frame or audio data point within that time scale, instead of a time unit. The scale is controlled in the same manner as described in the timeline controller. An individual frame within that scale is selected in the same manner as a particular time unit was selected in the timeline controller (i.e., manipulating the timeline or moving the indicator along the timeline).

In a window 210, a video track 200 contains a set of video clips 42*a* to 42*d*. In addition, a set of audio clips is also shown in a set of audio tracks 204. Video clips 42*a* to 42*d* can be removed from video track 200. Additional video clips may be inserted into video track 200 as necessary in a variety of ways, as desired by the user. Similarly, audio clips may also be inserted and removed at all points in audio track 204.

In FIG. 6, timeline 36 is divided into units of time which are further subdivided into individual frames in multimedia clips. Thus, the present invention enables a user to select one particular frame among any number of frames in a video clip. The selected time and frame is shown by the position of an indicator 33*a* along timeline 36. A corresponding indicator 38*b* is also displayed on horizontal bar 15 of scalable scroll controller 11 if horizontal bar 15 is in the appropriate section of scroll area 16. In addition, there is a selected time display 202 that is used to display the exact selected time. In FIG. 6, the currently selected frame corresponds to 0 minutes, 34 seconds and 27 frames into the clip.

The frame corresponding to the selected time/frame is pulled from the multimedia clip and displayed in another window (not shown). As the user changes the selected time/frame, the corresponding frame is pulled from the multimedia clip and displayed.

Context frames 42 are sampled at the beginning of each portion of the video clip and displayed in the appropriate segment of video track 200. Context frames 42 are used to gave the user a reference point as to the section of the video clip which is represented by that section of the timeline. Context frames 42 scroll in concert with timeline 36. If the user positions the cursor over a context frame 42 and "clicks" the mouse button, the multimedia controller responds in the same manner as when timeline 36 is "clicked".

One aspect of the multimedia controller is that it can be used to perform functions similar to the "jog" functions found on some high-end videotape decks. To scan over a video sequence, the user can zoom in (i.e., decrease the scale) so that the whole scene is covered in timeline 36. The user accomplishes this by adjusting the scale in reference to context frames 42. Indicator 38a is then dragged across timeline 36 to simulate the "jog" control, but at an adjustable scale.

As seen in FIG. 6, the size of scalable scroll controller 11 almost occupies all of scrollable area 16 as all available video and audio clips are contained in video track 200 and audio tracks 204, respectively. The total amount of time shown in video track 200 and audio track 204 when scalable scroll controller 11 occupies all, or most, of scrollable area 16 includes some blank portion that is not occupied by video or audio clips, respectively. This is to allow the user to insert video or audio clips as desired at the end of the respective video or audio tracks. In addition, the total amount of time shown in video track 200 and audio track 204 includes some blank portion that is not occupied by video or audio clips, respectively, when scalable scroll controller 11 is moved to the right most position of scrollable area 16.

Figure 7:
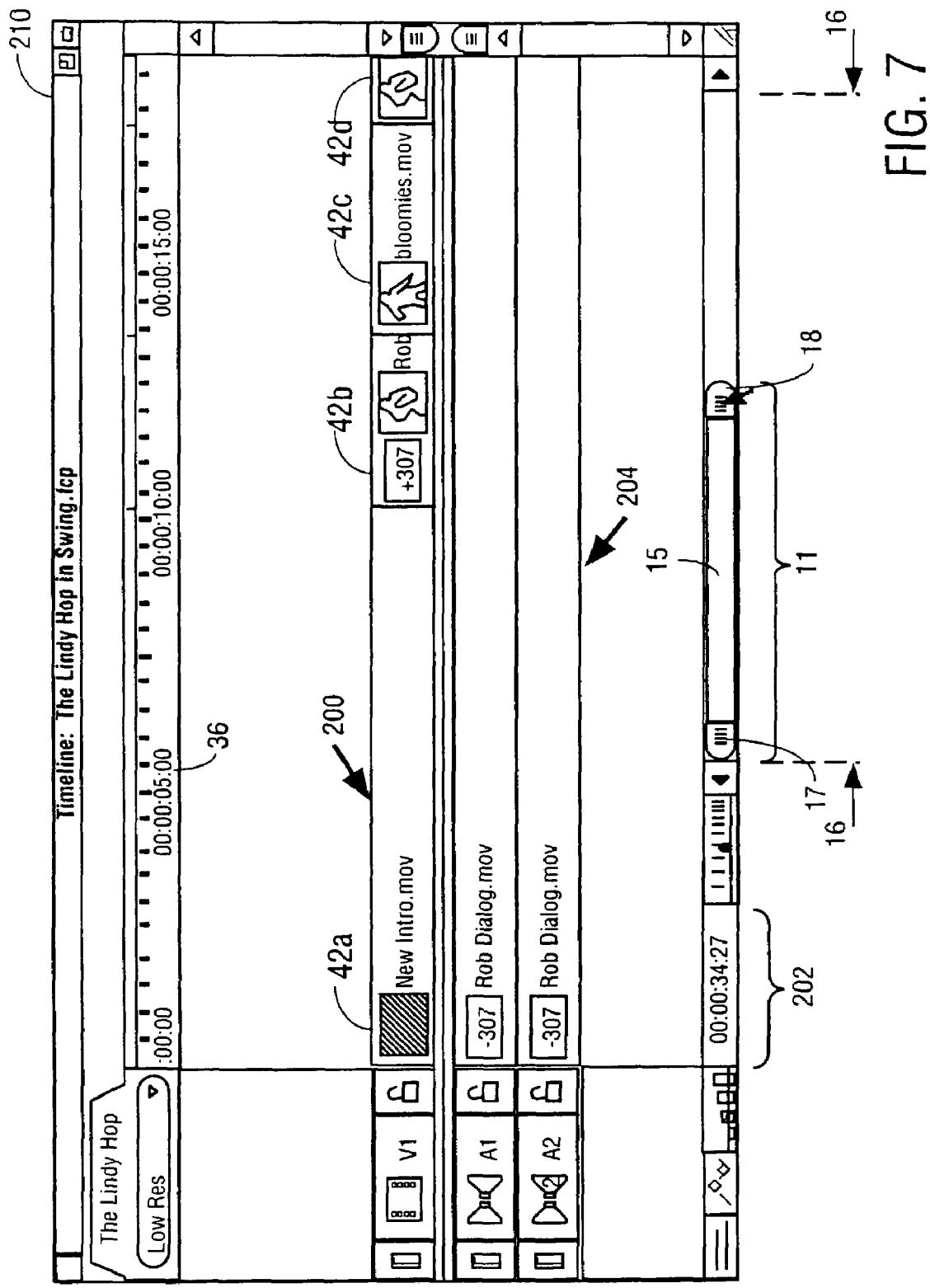
FIG. 7 depicts the multimedia controller where the scalable scroll controller has been selected by the user to decrease the amount of the timeline that is displayed.

FIG. 7 illustrates where scalable scroll controller 11 has been used to decrease the time scale that is shown in timeline 36. That is, the resolution of the time scale has been increased in window 210. The user has clicked-dragged scale controller 18 to the left to decrease the scale. Horizontal bar 15 is shortened accordingly to reflect that the width of scalable scroll controller 11 only occupies a proportional amount of scrollable area 16 as timeline 36 only represents a portion of the total timeline.

Alternatively, the user could have also clicked-dragged scale controller 17 to the right to decrease the scale. In either case, the scale controller that is not click-dragged remains in the substantially the same position. In alternate embodiments, the scale controller that is not click-dragged may mote the same distance in the opposite direction of the scale controller that is click-dragged such that the center of scalable scroll controller 11 remains in the same position.

Inspecting video track 200, it can be seen that the video clip 42a is longer in window 210 as the scale of timeline 36 has beer changed. In addition, as here is more space to display the video clips that are in the current scale, more preview information, such as the first frame of video clip 42b, can now be seen. In addition, there is also more space to display the audio clips in the current scale, as can be seen by examining audio track 204.

Figure 8:
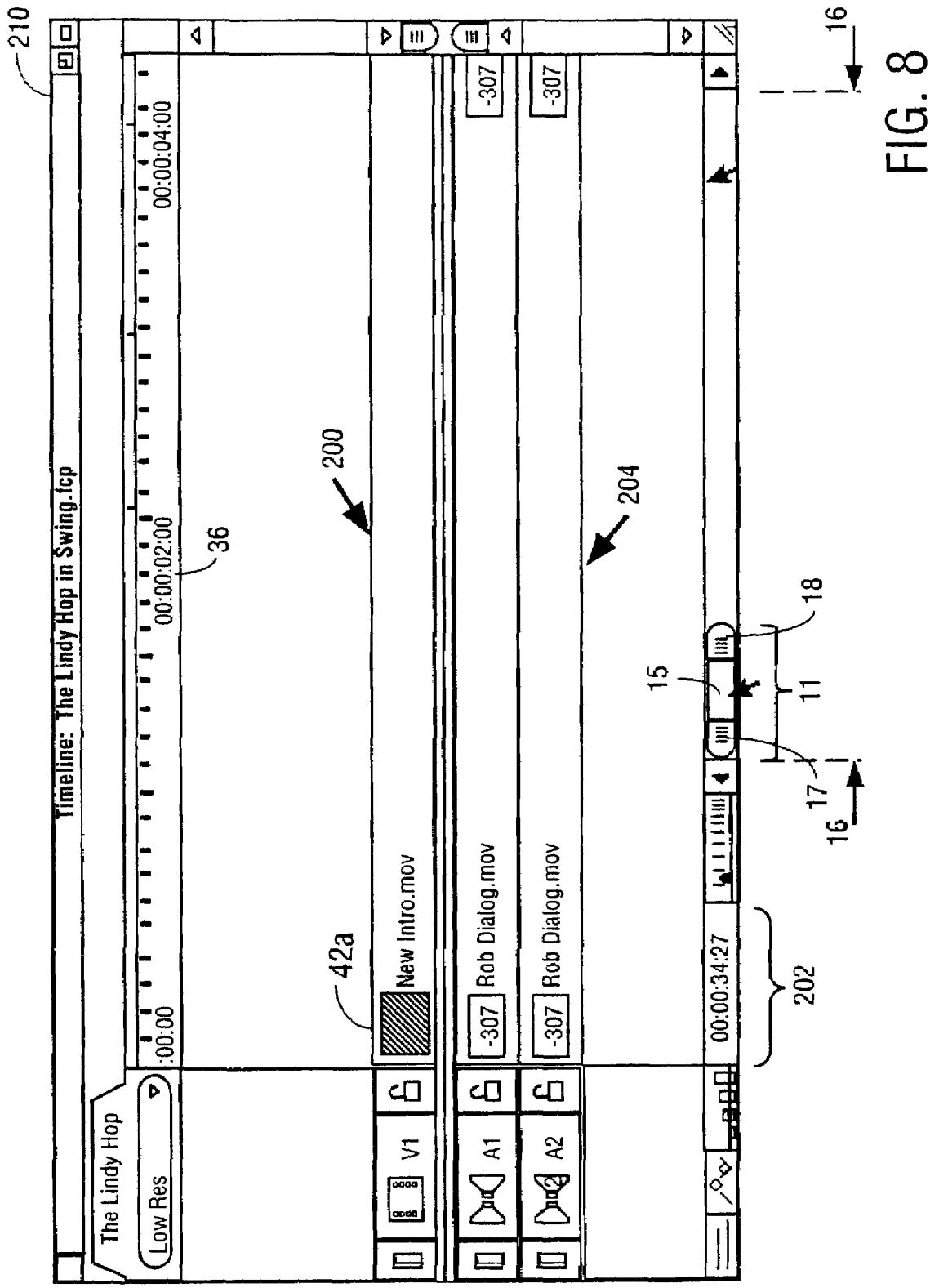
FIG. 8 depicts the multimedia controller where the scalable scroll controller has been selected by the user to further decrease the amount of the timeline that is displayed.

In FIG. 8, scale controller 18 has been click-dragged to the left even further to decrease the scale of information that is displayed in window 210. The size of horizontal bar 15 and, thereby, scalable controller, scale controller 18 has been click-dragged to the left even further to decrease the scale of information that is displayed in window 210. The size of horizontal bar 15 and, thereby, scalable scroll controller 11, is decreased accordingly.

Figure 9:
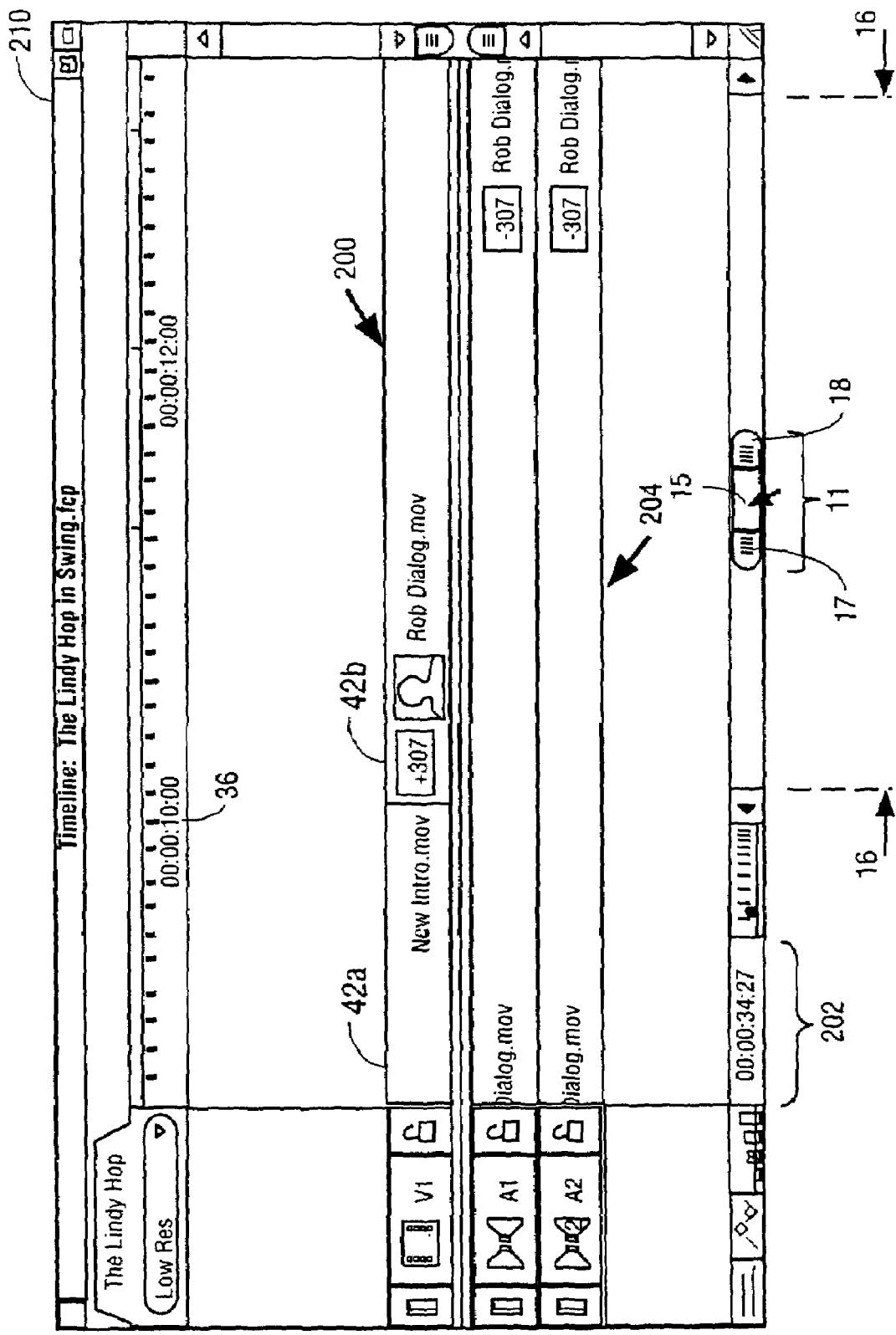
FIG. 9 depicts the multimedia con-roller where the scalable scroll controller has been selected by the user to move the range of the timeline that is displayed.

FIG. 9 illustrates where the user has click-dragged horizontal bar 15 to the right to scan the information that is in video track 200 and audio track 204. Thus, the range of the video and audio tracks that are being displayed is shifted to the right.

A method of the present invention will now be described by referring to FIG. 10. After computer system 100 has been initialized and all instructions and code segments have been loaded and executed such that display 121 shows window 210, the first step 802 is to receive a user selection event to the computer system 100 as shown in FIG. 2. User selection events can include events such as cursor movement and selection events or character entry events. These events are passed to an operating system software and handled by the operating system software.

In step 804, computer system 100 detects whether the user selection event is a selection event on a scale controller. Specifically, the computer system 100 detects whether the user has used a cursor control device to position the cursor on and selected either scale controller 17 or 18. If so, operation continues with step 806. Otherwise, operation continues with step 808.

Under step 806, if the user has selected scale controller 17 or 18, then a new scale upon which the level of detail of the data that is displayed depends is generated according to the movement of scale controller 17 or 18. The scale is used to create a range that is used to display continuous portions of the data set to the user. Thus, what is depicted by the range is dependent on the scale selected. As the scale is increased, the magnification level decreases. In other words, the range will span a broad portion of the data set. However, the resolution will be low. Conversely, if the scale is decreased, the magnification level increases and smaller portions of the data set are depicted by the range. However, the resolution increases.

In one embodiment, the initial scale that is used allows the complete set of data in the broad data set to be displayed in window 210. Thus, scalable scroll controller 11 is approximately the same width as scroll area 16. This allows the user to see the complete set of data. In another embodiment, a predetermined scale is used such that only a predetermined portion of the data is displayed. For example, a scale is chosen such that only one-quarter of the broad data set is displayed.

Once the user has released the selection on scale controller 17 or 18, then operation of the scalable scroll controller is complete until the next time a portion of the scalable scroll controller is selected.

In block 808, it is determined whether the user has selected horizontal bar 15. Thus, it is determined if the user has moved the cursor to be over horizontal bar 15 and used the cursor control device to select horizontal bar 15. If so, operation continues with step 810. Otherwise, operation continues with block 812.

When the user has selected horizontal bar 15, the range of the data set that is displayed may be manipulated and shifted horizontally according to the movement of the horizontal bar 15. For example, if horizontal bar 15 is moved to the left, then the range of the data set that is displayed as shifted the left. In another embodiment, if a vertical bar is used, then the range is shifted vertically. As discussed above, when horizontal bar 15 is moved to the farthest right, a portion of unused area is displayed for the user to add additional data by an operation such as a drag-and-drop of additional data.

In block 812, if the user selection event is not determined to be a selection on the scale controller or the horizontal bar, then the user selection event is passed on to other event handlers in the operating system software of computer system 100.

Figure 10:
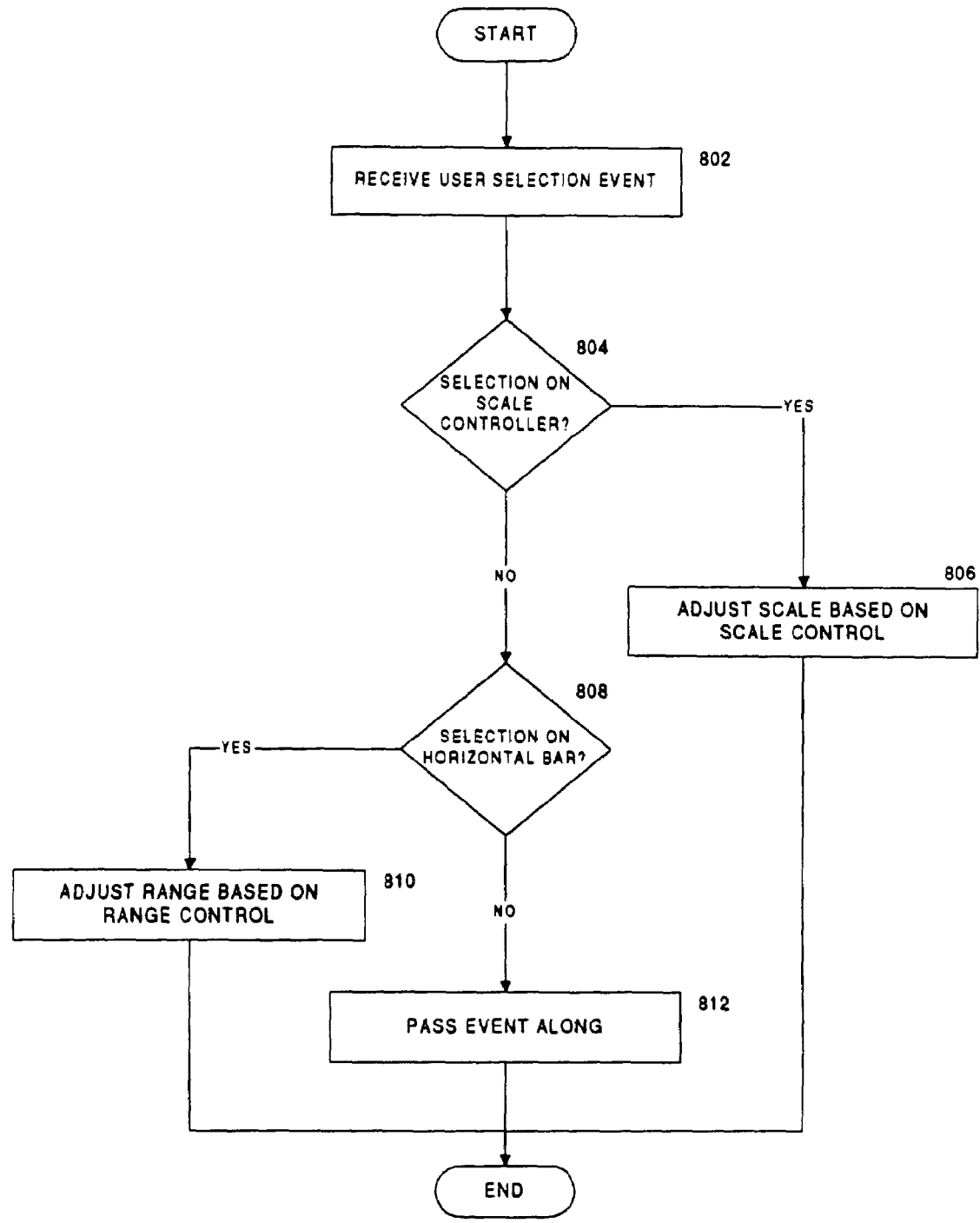
FIG. 10 is a flow chart of a method of operation of the present invention.
Figure 11:
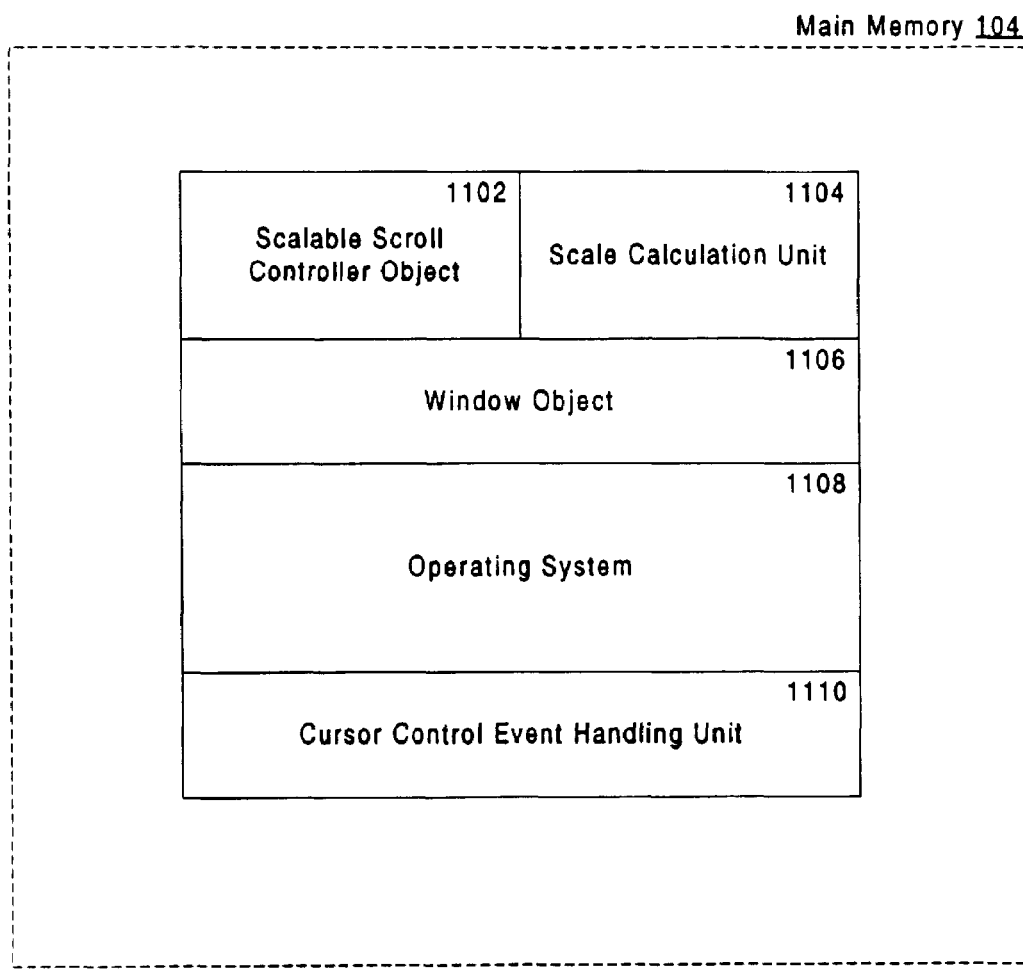
FIG. 11 is a block diagram of the contents of a memory in the computer system of FIG. 2.

FIG. 11 is a block diagram of main memory 104, containing functional blocks configured in accordance to one embodiment that is able to perform the method as described in FIG. 10. FIG. 11 contains a cursor control event handling unit 1110 communicating with an operating system 1108. Cursor control event handling unit receives all cursor control events such as cursor movement commands, selection commands (e.g., click), and drag commands (e.g., click-and-drag). Operating system 1108 provides system control functions for a computer system such as computer system 100. Operating system 1108 also performs functions such as data retrieval and display.

Main memory 104 also contains a window object 1106 that controls the display of a window such as window 210. Window object 1106 provides support for a scale calculation unit 1104 and a scalable scroll controller object 1102. Scalable scroll bar controller object 1102 is responsible for the display and control of a scalable scroll controller such as scalable scroll controller 11. Scale calculate on unit 1104 is used to calculate the appropriate scale and range for displaying information in a window object based on the configuration of a scalable scroll controller.

What is claimed is:

1. A method for accessing a data field comprising:
   providing a scalable scroll controller including a scale controller to modify a scale for controlling a magnification for accessing data within the data field;
   receiving a user event to modify scale through the scale controller;
   automatically adjusting the scalable scroll controller to maintain a center of the scalable scroll controller unchanged in response to receiving the user event; and
   adjusting the scale based on the receiving of the user event to modify scale through the scale controller.

2. The method of claim 1, further comprising:
   receiving a selection of the scale controller.

3. The method of claim 1, wherein receiving the user event includes receiving a movement of a cursor control device along a first axis.

4. The method of claim 1, wherein the scalable scroll controller has a width, and the scale is proportional to the width of the scalable scroll controller.

5. The method of claim 1, wherein the scale controller does not change size as the scale is changed.

6. The method of claim 1, wherein receiving the user event includes receiving a movement command from a voice command recognition unit.

7. An article comprising a computer readable medium having instructions stored thereon for accessing a data field, which when executed, causes:
   provision of a scalable scroll controller including a scale controller to modify a scale for controlling a magnification for accessing data within the data field;
   reception of a user event to modify scale through the scale controller;
   automatic adjustment of the scalable scroll controller to maintain a center of the scalable scroll controller unchanged in response to receiving the user event; and
   adjustment of the scale based on the reception of the user event to modify scale through the scale controller.

8. The article of claim 7, wherein the instructions further cause reception of a selection of the scale controller.

9. The article of claim 7, wherein reception of the user event includes reception of a movement signal of a cursor control device along a first axis.

10. The article of claim 7, wherein the scalable scroll controller has a width and the computer readable medium further having instructions stored thereon, which when executed, causes:
    adjustment of the scale to be proportional to the width of the scalable scroll controller.

11. The article of claim 7, wherein the scale controller does not change size as the scale is changed.

12. The article of claim 7, wherein reception of the user event includes reception of a movement command from a voice command recognition unit.

13. An apparatus for accessing a data field, the apparatus comprising:
    means for providing a scalable scroll controller including a scale controller to modify a scale for controlling a magnification for accessing data within the data field;
    means for receiving a user event to modify scale through the scale controller;
    means for automatically adjusting the scalable scroll controller to maintain a center of the scalable scroll controller unchanged in response to receiving the user event; and
    means for adjusting the scale based on the user event to modify scale through the scale controller.

14. The apparatus of claim 13, further comprising:
    means for receiving a selection of the scale controller.

15. The apparatus of claim 13, wherein the means for receiving the user event is provided by means for receiving a movement of a cursor control device along a first axis.

16. The apparatus of claim 13, wherein the scalable scroll controller has a width, and the scale is proportional to the width of the scalable scroll controller.

17. The apparatus of claim 13, wherein the scale controller does not change size as the scale is changed.

18. The apparatus of claim 13, wherein the means for receiving the user event is provided by means for receiving a movement command from a voice command recognition unit.

19. An apparatus for accessing a data field, the apparatus comprising:
    a scalable scroll controller including a scale controller configured to modify a scale for controlling a magnification for accessing data within the data field;
    a user event detection unit configured to detect a user event to modify scale through the scale controller;
    an automatic adjustment unit configured to automatically adjust the scalable scroll controller to maintain a center of the scalable scroll controller unchanged in response to receiving the user event; and
    a scale adjustment unit configured to adjust the scale based on the user event to modify scale through the scale controller.

20. The apparatus of claim 19, wherein the user event detection unit is configured to receive a signal from a cursor control device.

21. The apparatus of claim 19, wherein the user event detection unit is configured to receive a movement of a cursor control device along a first axis.

22. The apparatus of claim 19, wherein the scalable scroll controller has a width, and the scale is proportional to the width of the scalable scroll controller.

23. The apparatus of claim 19, wherein the user event detection unit is configured to receive a signal from a voice command recognition unit.

24. The apparatus of claim 19, wherein the user event detection unit is configured to receive a movement command from a voice command recognition unit.

* * * * *